G. C. THOMAS, Jr.
OUTLET BOX.
APPLICATION FILED NOV. 21, 1919.
1,383,879.
Patented July 5, 1921.
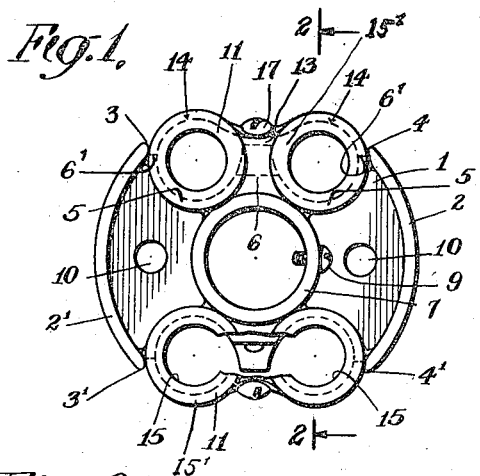
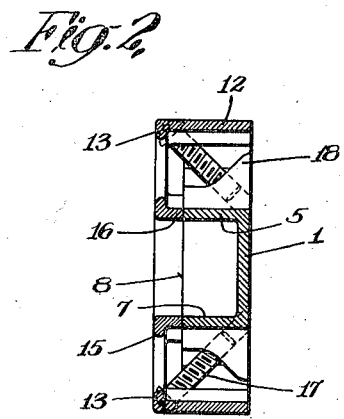
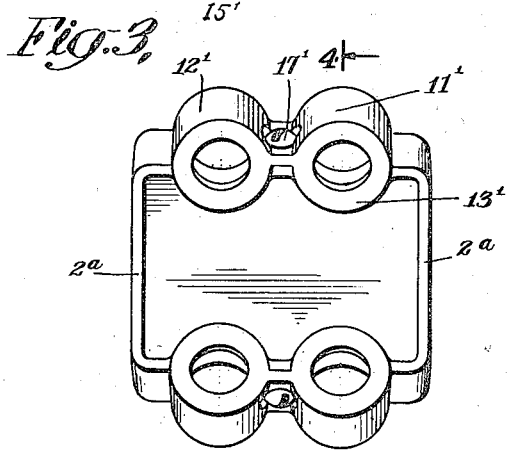
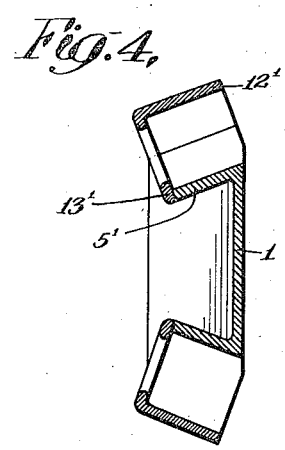
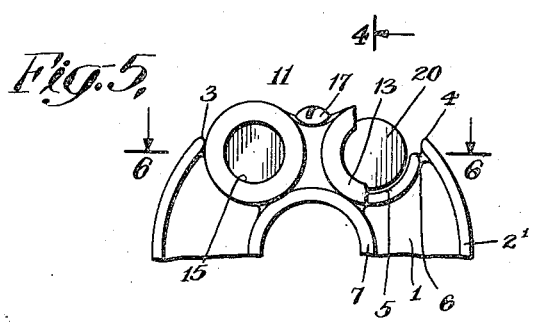
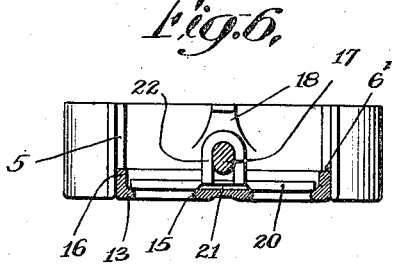
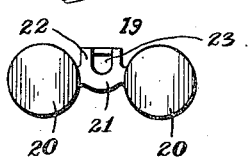
Inventor
George C. Thomas, Jr.
By his Attorney

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

OUTLET-BOX.

1,383,879.   Specification of Letters Patent.   Patented July 5, 1921.

Application filed November 21, 1919. Serial No. 339,576.

*To all whom it may concern:*

Be it known that I, GEORGE C. THOMAS, Jr., a citizen of the United States, residing at Elizabeth, in the county of Union and State of New Jersey, have invented certain new and useful Improvements in Outlet-Boxes, of which the following is a specification.

My invention relates to outlet boxes and particularly to novel constructions by which electrical cables or conduits are connected to the box. In accordance with my invention the box is provided with a peripheral wall which is so curved and constructed at one or more points as to serve as a seat for an electrical cable or conduit, a movable clamping device being arranged to coöperate with such fixed seat to hold the conduit in position.

The object of my invention is to provide simple and efficient devices of the character referred to, in which the wall of the outlet box itself is utilized as a seating surface for the entering conduit or conduits, and in coöperation with a movable clamp member as a securing means for the conduit or conduits. Other objects of my invention comprise improved construction of parts and combinations of elements, among which is included an improved form of "knock-out" device for closing an adjacent pair of conduit openings, in combination with the means by which the knockout device is secured in position until such time as one or both of the openings are required for use.

In the preferred form of my device the peripheral walls of the box are curved inwardly of the box on opposite sides thereof, so that the outside surfaces of the curved-in wall portions will constitute seating surfaces for the conduits, the movable clamp members being adapted to engage against the outside surfaces of the conduits and bridge the spaces in the contour of the box which are formed by the inward curving of the walls referred to. With such a construction space is economized and the manner of using the device is simplified since it is possible to first secure the box to a surface against which it is to be positioned, then position the conduits against the curved seat portions of the box, and then position the movable clamp members.

In order that a clearer understanding of my invention may be had, attention is hereby directed to the accompanying drawings forming part of this application and illustrating certain embodiments of my invention.

In the drawings, Figure 1 represents a front elevation of an outlet box embodying my invention, partly shown broken away; Fig. 2 is a section taken on line 2—2 of Fig. 1; Fig. 3 is a front elevation of a modified form of construction; Fig. 4 is a section taken on line 4—4 of Fig. 3; Fig. 5 is a partial front elevation of a form of outlet box similar to that shown in Fig. 1, showing the use of an improved form of knockout device; Fig. 6 is a section taken on line 6—6 of Fig. 5; and Fig. 7 is a plan view of the knockout device viewed from the inside.

Referring to the drawings, in Fig. 1 I have illustrated an outlet box having a base or bottom portion 1 and a peripheral wall or flange 2 extending upwardly therefrom. In the form of construction illustrated the wall 2 extends with its usual contour, which is circular in the form of device illustrated, from the point marked 3 on one side of the horizontal center line of the device, as illustrated in Fig. 1, to a corresponding point 3' on the opposite side of said line. Similarly, on the opposite side of the vertical center line of the construction, as illustrated in Fig. 1, the wall 2 extends with its usual contour from a point 4 on one side of the horizontal center line to a similar point 4' or on the opposite side of the horizontal center line.

Between the points 3 and 4 the wall 2 is curved inwardly of the box to provide a pair of approximately semi-circular seating surfaces, shown in dotted lines in Fig. 1 at 5, 5, the curved surfaces 5, 5, being joined together by a connecting portion of metal 6. On the opposite side of the construction the points 3', 4', of the peripheral wall are similarly joined together by an inwardly curved portion of the wall. Preferably, narrow vertical seating surfaces 6', 6', are provided at the outside ends of the curved-in portions 5, 5, of the wall, adjacent the end portions 3, 4, of the portions of wall of normal contour, as is indicated in dotted lines in Fig. 1, and similarly at the opposite side.

Preferably, the base portion 1 of the box is provided with an upwardly extending axial hub or boss 7 which is preferably joined to the inwardly curved wall portions 5 and 6, this construction facilitating the manufacture of the box in addition to which the tubular portion 7 and the connecting flanges 5, 6, mutually strengthen each other. Preferably, the flanges 5, 6, and the tube or hub 7 are of a uniform height, as is indicated at 8 in Fig. 2, which height is less than that of the portions 2' of the peripheral wall which are of normal contour.

In the construction illustrated the bottom 1 of the box is provided with an axial opening which is surrounded by the boss 7, and a screw 9 is provided to extend through the boss 7, to secure the box firmly against a gas pipe or stud which may be inserted within the boss 7. Holes 10, 10 may be provided in the bottom of the box through which screws or the like may be extended to secure the box to a ceiling or other supporting surface.

In the construction illustrated in Figs. 1 and 2 a pair of movable clamping devices 11, 11 are provided, each of which has a vertical outside flange 12 and a horizontal top flange 13. The vertical flange 12 is provided on its inner surface with a pair of curved seating portions 14, 14, which are adapted to engage the outer surfaces of conduits or cables, the inner surfaces of which engage the fixed seating surfaces 5, 5 on the box wall. The ends of the vertical flanges 12 are adapted to seat against the vertical end seats 6', 6', on the box wall, this construction being indicated in dotted lines in Fig. 1.

The top flange 13 of each clamping member 11 is provided with a pair of openings 15, 15, the top flange constituting in effect a pair of rings 15' connected by an intermediate portion. The inner surfaces of the rings are rounded to form smooth antifriction surfaces through which the conductors in the conduits or cables may be passed without abrasion. The inner edge of each top flange 13 is flanged downwardly, as is shown at 16, to form a seating surface which is adapted to rest on top of the inwardly curved wall portions 5 and 6. In the construction illustrated in Figs. 1 and 2 the total height of each clamping member 11 is approximately the same as that of the portions 2' of the wall of the box, the height of the wall portions 5 and 6 together with the flanges 16 resting thereon being approximately the same as of the wall portions 2' of the box, so that the clamps when mounted in position will not extend above the upper surfaces of the portions 2' of normal contour of the box wall.

Each clamping member 11 may be secured in position by suitable means such as a screw 17 which extends through an opening in the clamping member intermediate the rings 15', 15', and screws into the box wall at a point intermediate the seating surfaces 5, 5. As is shown in Figs. 1 and 2, the portion 6 of the box wall connecting each pair of seating surfaces 5, 5, curves outwardly adjacent its lower edge to form a boss 18 which may be provided with a tapped opening in which the screw 17 is adapted to extend, the screw extending downwardly and inwardly of the box at an inclination in this form of device.

With this form of construction it will be noted that the box may be mounted in position, after which electrical conduits may be positioned against one or more of the curved surfaces 5. The clamp or clamps 11 are then positioned against the outside surface of the conduit or conduits, and each clamp secured to the box by adjusting its screw 17 into position, which will also serve to clamp the conduit or adjacent conduits in position, and the desired connections made within the box.

In Figs. 3 and 4 I have illustrated a modified form of device in which clamps 11' are each mounted on an inclination to the vertical axis of the box. In this case the inwardly curved portions 5' of the box wall are mounted at an inclination to the vertical, the outside flange 12' of the clamp being mounted on a similar inclination and the top flange 13', which is adapted to seat on the top of the inwardly curved portion 5' of the box wall, extending inwardly from the inside flange 12' at right angles thereto. Each clamp is held in position in the same manner as has been previously described by means of screws 17'. In this form of device the portions 2ª, of normal contour of the box wall, are illustrated as being rectangular.

In Figs. 5, 6 and 7 I have illustrated the use of my preferred form of knockout device 19. This device comprises a pair of disks 20, 20 of sheet metal which are connected together by a neck 21, from the end of which extends a stirrup 22 at an inclination, this stirrup surrounding an opening 23.

When the clamp 11 is to be positioned the knockout device is mounted inside the same with the disks 20, 20, resting, preferably, against the inside surface of the top flange so as to cover the openings in the two rings. As so mounted the stirrup 22 will rest against the outside flange 12 of the clamping member, intermediate the seating surfaces 14 of the clamp, with the opening 23 of the knockout device in alinement with the opening in the outside wall of the clamp through which the screw 17 is adapted to extend. When, therefore, the screw 17 is adjusted in position the knockout device will be supported in position by the screw which extends through the same on the outer side. The disks 20 of the knockout device are connected to the intermediate portion 21 by comparatively narrow necks of metal, as is illustrated. When, therefore, it is desired to utilize one of the conduit openings, the knockout disk covering the same may be readily broken off by a sharp blow directed at its upper surface, the stirrup portion of the knockout device and the disk 20 covering the adjacent opening being left in position.

The construction illustrated, in which screw 17 extends inwardly and downwardly (that is, toward the base,) at an inclination, is advantageous, because the screw-head is thereby removed some distance from the base 1, and rendered more easily accessible than if it were close to the base. If the screw-head were close to the base it would be back of the surface line of the plaster, when the box is mounted against the lath of a ceiling or the like.

It will be understood that my invention is not strictly limited to the exact details of construction described, but is as broad as is indicated by the accompanying claims.

What I claim is:—

1. In an outlet box, the combination of a box member having a base and a peripheral wall, said wall being curved inwardly of the member, for a sufficient distance to enable its outside surface to serve as a seat for an electrical conduit, a clamp suitably curved to press against the outer surface of the conduit, and means for securing said clamp to said box member and clamping the conduit in position, comprising a screw extending downwardly and inwardly at an angle from the upper portion of said clamp into said member.

2. In an outlet box, the combination of a box member having a base and a peripheral wall, said wall being curved inwardly of the member for a portion of its length so that its outside surface will form a pair of adjacent seats for electrical conduits, a clamp having a flange suitably curved to press against the outer surfaces of the conduits, and means for securing said clamp to said box member and clamping the conduits in position, comprising a screw extending downwardly and inwardly at an angle from the upper portion of said clamp into said member.

3. In an outlet box, the combination of a box member having a base and a peripheral wall, said wall being curved for a suitable distance so as to form a seat for an electrical conduit, a clamping member having a flange curved to engage against the side of the conduit opposite to that which rests against said seat and a top flange comprising an annulus, and means for securing said clamping member to said box member and clamping the conduit in position, comprising a screw extending downwardly at an angle toward said seat, from the upper portion of said clamp into said member.

4. In an outlet box, the combination of a box member having a base and a peripheral wall, said wall being curved for a suitable distance so as to form a seat for an electrical conduit, a clamping member having a flange curved to engage against the side of the conduit opposite to that which rests against said seat and a top flange comprising an annulus, at right angles to said first flange, and means for securing said clamping member to said box member with the edge portion of said top flange resting on the top of the curved portion of said peripheral wall.

5. In an outlet box, the combination of a box member having a base and a peripheral wall, said wall being curved for a suitable distance so as to form a pair of adjacent seats for electrical conduits, a clamp having a flange suitably curved to engage against the sides of the conduits opposite to those which rest against said seats, said wall being arranged at the ends of said curved portion to form seats for the ends of said flange, and means extending through said clamp at a point removed from said base for securing said clamp to said box member, and clamping the conduits in position.

6. In an outlet box, the combination of a box member having a base and a peripheral wall, said wall having its contour changed for a suitable distance to provide a portion curved so as to form a seat for an electrical conduit, with vertical seats at the ends of said curved portion, a clamp suitably curved to engage against the side of the conduit opposite to that which rests against said curved seat, and having vertical end portions adapted to rest against said vertical seats, and means extending through said clamp at a point removed from said base for securing said clamp to said box member and clamping the conduit in position.

7. In an outlet box, the combination of a box member having a base and a peripheral wall, said wall being curved inwardly of the member for a portion of its length so that its outside surface will form a pair of adjacent seats for electrical conduits, a clamp having a flange suitably curved to press against the outer surfaces of the conduits and a top flange comprising a pair of rings, and a screw intermediate said rings arranged to secure said clamp to said wall, with the edge portion of said top flange resting on the top of the curved portion of said wall.

8. In an outlet box, the combination of a box member having a base and a peripheral wall, said wall being curved for a suitable distance so as to form a pair of adjacent seats for electrical conduits, a clamp having a flange suitably curved to engage against the sides of the conduits opposite to those which rest against said seats and a top flange comprising a pair of rings, a screw intermediate said rings arranged to secure said clamp to said wall, and a knockout device comprising a pair of disks, with a connecting stirrup having an opening through which said screw may pass to hold said device in position.

9. In an outlet box, the combination of clamping means providing fixed curved surfaces against which a pair of adjacent cables may rest, a pair of rings through which conductors within said cables may pass, and movable curved surfaces adapted to engage the sides of said cables opposite to those engaged by said fixed curved surfaces, a knockout device comprising a pair of disks with a connecting stirrup having an opening therethrough, and a screw adapted to secure the movable portion of said clamp to the fixed portion and to extend through the opening in said stirrup to hold said knockout in position.

This specification signed and witnessed this 19 day of November, 1919.

GEORGE C. THOMAS, Jr.

Witnesses:
ADNAH McMURTINS,
H. VAN COTT HOLLAND.